(12) United States Patent
Jung et al.

(10) Patent No.: US 8,782,137 B2
(45) Date of Patent: Jul. 15, 2014

(54) MULTI-HOP MIMO SYSTEM AND METHOD

(75) Inventors: Joon Young Jung, Daejeon (KR); Jeun Woo Lee, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 54 days.

(21) Appl. No.: 13/193,203

(22) Filed: Jul. 28, 2011

(65) Prior Publication Data

US 2012/0117150 A1    May 10, 2012

(30) Foreign Application Priority Data

Nov. 4, 2010 (KR) .................. 10-2010-0109297

(51) Int. Cl.
*G06F 15/16* (2006.01)

(52) U.S. Cl.
USPC ........... 709/204; 709/230; 709/231; 370/312; 370/431

(58) Field of Classification Search
None
See application file for complete search history.

(56) References Cited

U.S. PATENT DOCUMENTS

| | | | | |
|---|---|---|---|---|
| 7,606,187 B2* | 10/2009 | Zeng et al. | ..................... | 370/312 |
| 7,657,644 B1* | 2/2010 | Zheng | ........................... | 709/231 |
| 8,023,524 B2* | 9/2011 | Doppler et al. | ............... | 370/431 |
| 2005/0132000 A1* | 6/2005 | Richardson et al. | .......... | 709/204 |

FOREIGN PATENT DOCUMENTS

| | | |
|---|---|---|
| JP | 2007-274194 | 10/2007 |
| JP | 2007274194 | * 10/2007 |
| KR | 10-0163480 | 9/1998 |
| KR | 10-2007-0100112 | 10/2007 |
| KR | 10-20080047000 | 5/2008 |

OTHER PUBLICATIONS

Petrovic, T and Fertalj, K. 2009. Demystifying Desktop Virtualization. ACS'09 Proceedings of the 9th WSEAS international conference on Applied computer science. pp. 241-246.*

* cited by examiner

*Primary Examiner* — Jung Kim
*Assistant Examiner* — Janusz Kusyk
(74) *Attorney, Agent, or Firm* — Staas & Halsey LLP

(57) ABSTRACT

Disclosed are a multi-hop MIMO system and method. The multi-hop MIMO system according to an exemplary embodiment of the present invention includes: a server including a plurality of virtual machines; one remote screen device first connected to the server through at least one virtual machine of the plurality of virtual machines, receiving screen data from the server in a unicast scheme, and driven as a multicast server; and a plurality of different remote screen devices connected to the server through the at least one virtual machine, existing on a sub network where the one remote screen device exist, operating as multicast clients, receiving the screen data from the server or the one remote screen device in a multicast scheme, wherein the one remote screen device and the plurality of different remote screen devices simultaneously output the same screen data.

11 Claims, 8 Drawing Sheets

MULTI-HOP MIMO SYSTEM AND METHOD

CROSS-REFERENCE TO RELATED APPLICATIONS

This application claims priority under 35 U.S.C. §119 to Korean Patent Application No. 10-2010-0109297, filed on Nov. 4, 2010, in the Korean Intellectual Property Office, the disclosure of which is incorporated herein by reference in its entirety.

TECHNICAL FIELD

The present invention relates to a multi-hop multiple-input and multiple-output (MIMO) method, and more particularly, to multi-hop MIMO system and method capable of transmitting and receiving data in a multicast scheme even although a multicast protocol is not supported in a network layer.

BACKGROUND

In general, virtualization systems include a number of virtual machines and each virtual machine can use a number of peripheral input/output devices to establish a computing environment.

A virtualization system can simultaneously show a screen of the same virtual machine to a number of participants for a meeting on a network, and can dynamically show screen data of a specific virtual machine on a number of remote screen devices. For example, the virtualization system can show a screen of the same virtual machine to a number of educated people in a place for education.

To this end, the virtualization system according to the related art uses a multicast scheme. In this case, the characteristics of UDP packets cause packet loss and screen deterioration according to the packet loss during long-distance transmission.

Further, the virtualization system according to the related art cannot transmit and receive screen data between a server and a client in the case where a multicast protocol is not supported in a network layer (that is, a router) or in the case where the client does not support an internet group management protocol (IGMP).

SUMMARY

An exemplary embodiment of the present invention provides a multi-hop MIMO system, including: a server including a plurality of virtual machines; one remote screen device first connected to the server through at least one virtual machine of the plurality of virtual machines, receiving screen data from the server in a unicast scheme, and driven as a multicast server; and a plurality of different remote screen devices connected to the server through the at least one virtual machine, existing on a sub network where the one remote screen device exist, operating as multicast clients, receiving the screen data from the server or the one remote screen device in a multicast scheme, wherein the one remote screen device and the plurality of different remote screen devices simultaneously output the same screen data.

Another exemplary embodiment of the present invention provides a multi-hop MIMO method of a server, including: if selection registration of a different remote screen device is requested subsequently to one remote screen device, checking whether the different remote screen device is a device for multiple-output; if the different remote screen device is a device for multiple-output, checking whether the different remote screen device and the one remote screen device exist on the same sub network; if the different remote screen device and the one remote screen device exist on the same sub network, checking the different remote screen device and the server exist on different sub networks; and if the different remote screen device and the server exist on different sub networks, transmitting screen data from the one remote screen device to the different remote screen device in a multicast scheme.

Yet another exemplary embodiment of the present invention provides a multi-hop MIMO method of a server, including: if release of assignment for a remote screen device is requested, checking whether the remote screen device is a device for multiple-output; if the remote screen device is a device for multiple-output, checking whether the remote screen device is performing communication in a multicast scheme; if the remote screen device is performing communication in the multicast scheme, checking whether the remote screen device is operating as a multicast server; if the remote screen device is operating as the multicast server, checking whether the number of multicast clients receiving screen data from the remote screen device in the multicast scheme is two or more; and if the number of multicast clients is two or more, selecting a new multicast server from the multicast clients and releasing the connection with the remote screen device.

Other features and aspects will be apparent from the following detailed description, the drawings, and the claims.

DETAILED DESCRIPTION OF EMBODIMENTS

Figure 1:
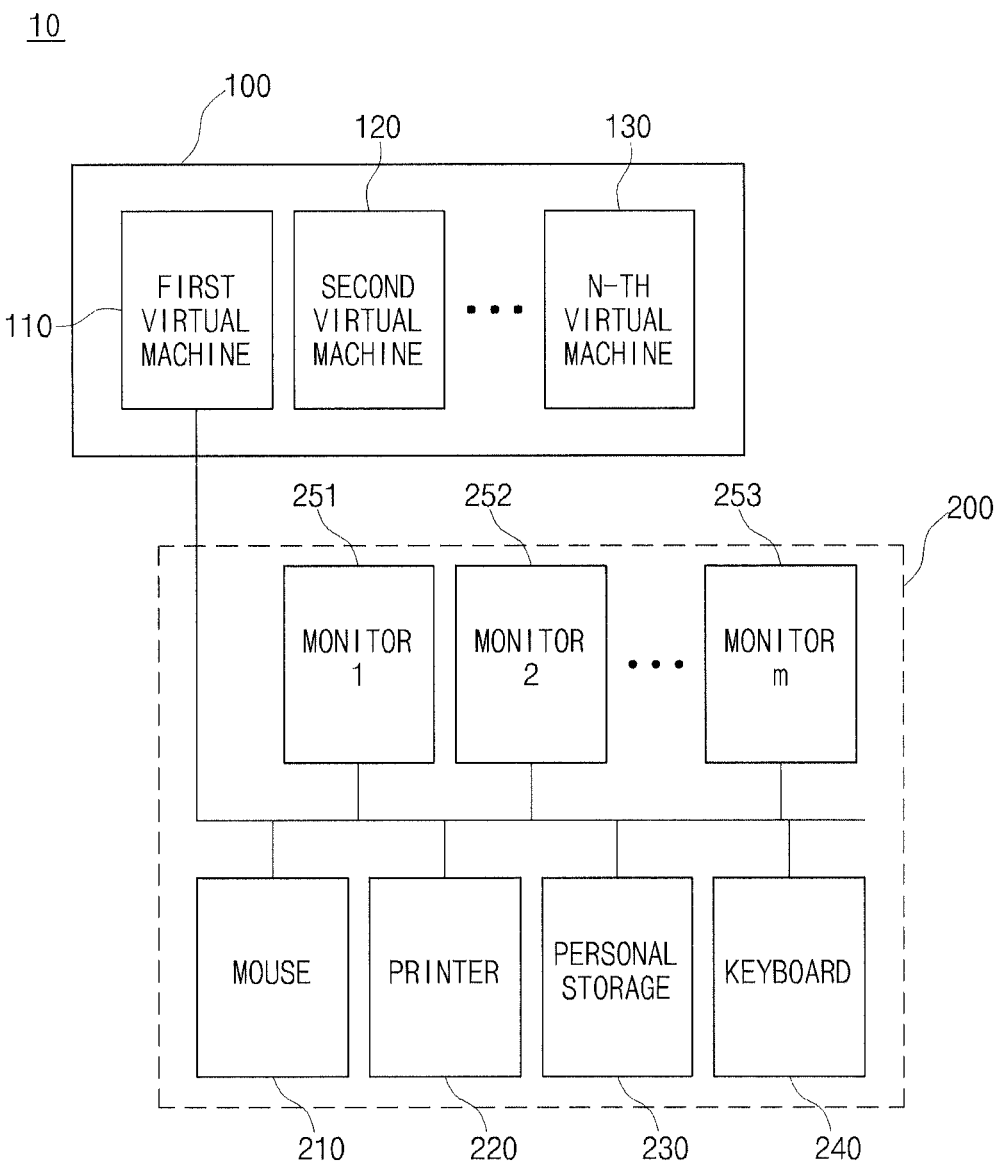
FIG. 1 is a view illustrating a virtualization system according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Now, exemplary embodiments of the present invention will be described in detail with reference to the accompanying drawings. FIG. 1 is a view illustrating a virtualization system according to an exemplary embodiment of the present invention.

As shown in FIG. 1, a virtualization system 10 according to the exemplary embodiment of the present invention includes a server 100 and a plurality of remote input/output devices 200.

The server 100 includes a plurality of virtual machines (including virtual machines 110, 120, and 130), and a first virtual machine 110 may establish a computing environment using the plurality of remote input/output devices 200.

The first virtual machine 110 may use a mouse 210 as an input mouse, a printer 220 as a print device, a personal storage device 230 such as a PDA or the like as a storage device, a virtual keyboard 240 as an input device, and a plurality of monitors 251, 252, and 253 as screen output devices, so as to create a computing environment simultaneously outputting the same screen to the plurality of monitors 251, 252, and 253.

The plurality of remote input/output devices 200 is connected to the server 100 through, for example, the first virtual machine 110, and outputs data transmitted from the first virtual machine 110 or transmits input data to the first virtual machine 110.

In this case, the server 100 and the plurality of remote input/output devices 200 may be on the same sub network or different sub networks, and may transmit and receive data in a multicast scheme or a unicast scheme.

Figure 2:
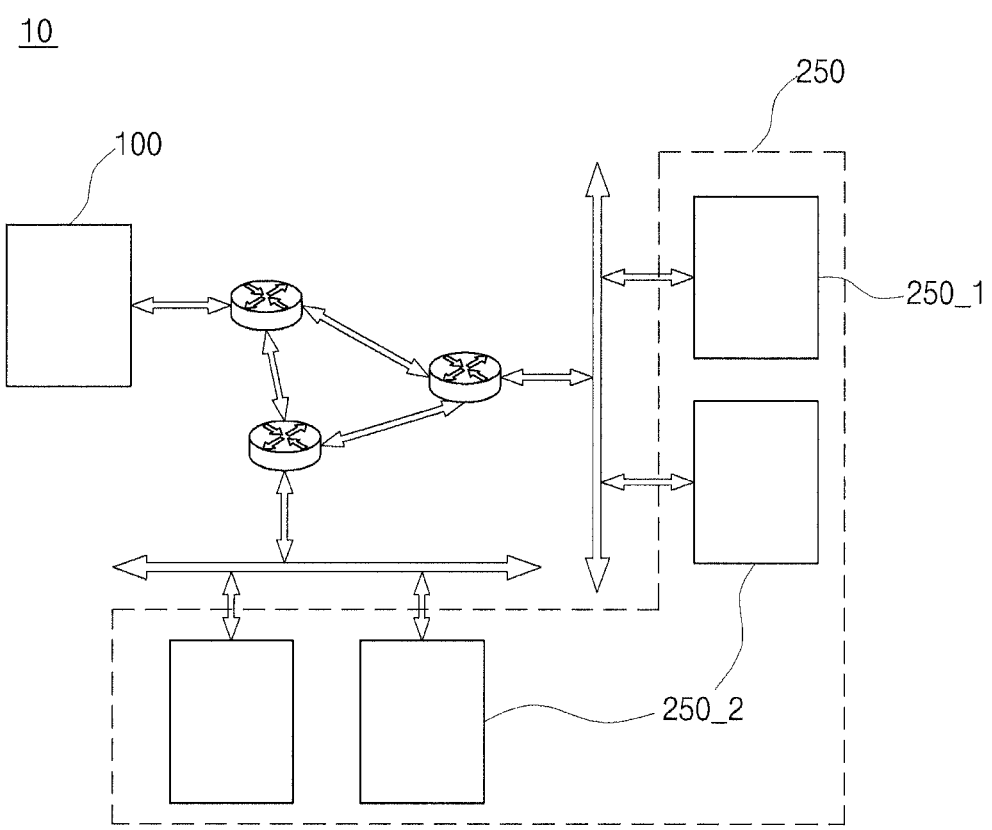
FIG. 2 is a view illustrating a configuration of a multi-hop MIMO system according to an exemplary embodiment of the present invention.

Now, a multi-hop MIMO system according to an exemplary embodiment of the present invention which can simultaneously show screen data to a plurality of monitors as shown in FIG. 1 will be described with reference to FIG. 2. FIG. 2 is a view illustrating a configuration of a multi-hop MIMO system according to an exemplary embodiment of the present invention.

As shown in FIG. 2, a multi-hop MIMO system 10 according to the exemplary embodiment of the present invention includes a server 100 and a plurality of remote screen devices 250_1 and 250_2.

The server 100 includes one or more virtual machines and transmits screen data of a virtual machine to the plurality of remote screen devices 250.

Specifically, a virtual machine of the server 100 transmits screen data to one remote screen device 250_1, which is first connected with the server 100, in a unicast scheme and transmits the screen data to a different remote screen device 250_2, which is additionally connected to the server 100, in a multicast scheme through a screen process management module 113 (see FIG. 3) of the server 100 or the one remote screen device 250_1.

The plurality of remote screen devices 250 may be PCs or smart phones which display data received from the virtual machine of the server 100 on screens.

The plurality of remote screen devices 250 include the one remote screen device 250_1 which is first connected to the server 100 and at least one different remote screen device 250_2 added after the one remote screen device 250_1.

The one remote screen device 250_1 receives the screen data from the server 100 in the unicast scheme, and operates as a multicast server in some cases to transmit the screen data in the multicast scheme.

Specifically, in the case where the one remote screen device 250_1 and a different remote screen device 250_2 exist on the same sub network but the one remote screen device 250_1 and the server 100 exist on different sub networks, the one remote screen device 250_1 operates as a multicast server to transmit the received screen data to the different remote screen device 250_2 in the multicast scheme.

Each of the at least one different remote screen device 250_2 may receive the screen data in three following schemes according to whether the corresponding different remote screen device 250_2 and the server 100 exist on the same sub network and whether the corresponding different remote screen device 250_2 and the one remote screen device 250_1 exist on the same sub network.

First, in the case where the corresponding different remote screen device 250_2 and the server 100 exist on different sub networks but the corresponding different remote screen device 250_2 and the one remote screen device 250_1 exist on the same sub network, the corresponding remote screen device 250_2 receives the screen data from the one remote screen device 250_1 in the multicast scheme.

Second, in the case where the corresponding different remote screen device 250_2 and the server 100 exist on different sub networks and the corresponding different remote screen device 250_2 and the one remote screen device 250_1 exist on different sub networks, the corresponding different remote screen device 250_2 is connected to the server 100 in a unicast communication scheme, and receives the screen data from the server 100 in the unicast scheme.

Third, in the case where the corresponding different remote screen device 250_2, the server 100, and the one remote screen device 250_1 exist on the same sub network, the corresponding different remote screen device 250_2 receives the screen data from the server 100 in the multicast scheme. In this case, the server 100 stops transmitting the screen data to the one remote screen device 250_1 in the unicast scheme. Then, the one remote screen device 250_1 and the corresponding different remote screen device 250_2 become multicast clients for the server 100 and receive the screen data from the server 100 in the multicast scheme.

As described above, the server 100 according to the exemplary embodiment of the present invention can transmit data to the different remote screen devices 250_2 in sub networks connected to the server 100 through a router in the multicast scheme even when the router does not support the multicast protocol.

Figure 3:
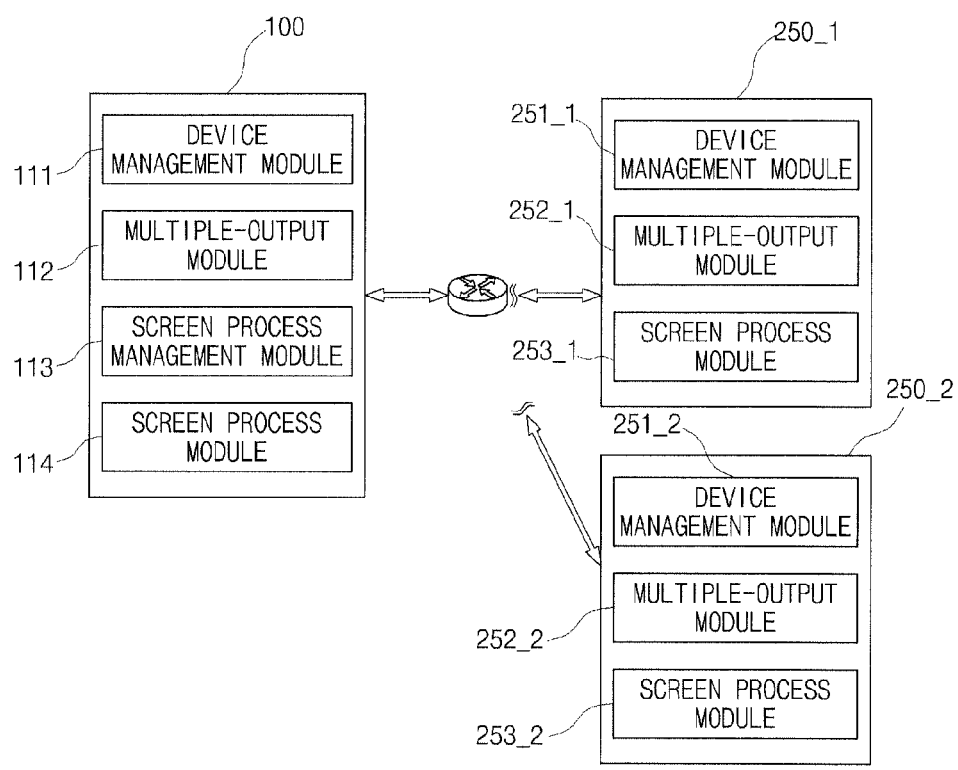
FIG. 3 is a view illustrating a detailed configuration of a server and a plurality of remote screen devices according to an exemplary embodiment of the present invention.

Now, a detailed configuration of the server 100 and the plurality of remote screen devices will be described with reference to FIG. 3. FIG. 3 is a view illustrating a detailed configuration of the server and the plurality of remote screen devices according to an exemplary embodiment of the present invention.

As shown in FIG. 3, the server 100 includes a device management module 111, a multiple-output module 112, a screen process management module 113, and a screen process module 114.

The device management module 111 of the server determines selection or release of any one remote screen device of the plurality of remote screen devices 250 according to a request of the corresponding remote screen devices 250 or manipulation by a user.

The multiple-output module 112 of the server checks remote screen devices to be connected in the unicast scheme and remote screen devices to be connected in the multicast scheme by using registration information. Then, according to the checked result, the multiple-output module 112 of the server transmits the registration information to the screen process management module 113 or transmits information necessary for operating as multicast servers or multicast clients to multiple-output modules 252_1 and 252_2 of the remote screen devices.

The multiple-output module 112 of the server releases unicast scheme or multicast scheme connection of a different remote screen device 250_2 for which release has been requested by using release information or determines a remote screen device to operate as a multicast server instead of the different remote screen device 250_2. The detailed function of the multiple-output module 112 of the server will be described below with reference to FIGS. 4A to 5C.

The screen process management module 113 of the server generates the screen process module 114 and transmits the screen data through the screen process module 114 in the unicast scheme, or transmits the screen data to the remote screen devices in the multicast scheme by operating as a multicast server.

The screen process module 114 of the server performs connection with a screen process module 253 of a remote screen device for communication using the unicast scheme and transmits the screen data to the screen process module 253 of the remote screen device.

As shown in FIG. 3, each of the plurality of remote screen devices 250 includes a device management module 251, a multiple-output module 252, and a screen process module 253.

The device management module 251 of each of the remote screen devices requests registration or release of the corresponding remote screen device 250 to the server 100 according to manipulation by the user or connection with a network.

The multiple-output module 252_1 of the one remote screen device 250_1 operates as a multicast server to transmit the screen data, received from the screen process management module 113 of the server in the unicast scheme, to the multiple-output module 252_2 of the at least one different remote screen device in the multicast scheme.

Meanwhile, the multiple-output module 252_2 of the at least one different remote screen device operates as a multicast client to receive the screen data from the screen process management module 113 of the server or the multiple-output module 252_1 of the one remote screen device 250_1 in the multicast scheme.

The screen process module 253 outputs the screen data, received from the screen process management module 113 of the server or the multiple-output module 251_1 of the one remote screen device 250_1 in the multicast scheme or the unicast scheme, to the user.

Now, a method of driving a multi-hop MIMO system based on detailed devices of a server 100 and remote screen devices 250 according to an exemplary embodiment of the present invention will be described with reference to FIGS. 4A to 5C.

Figure 4A:
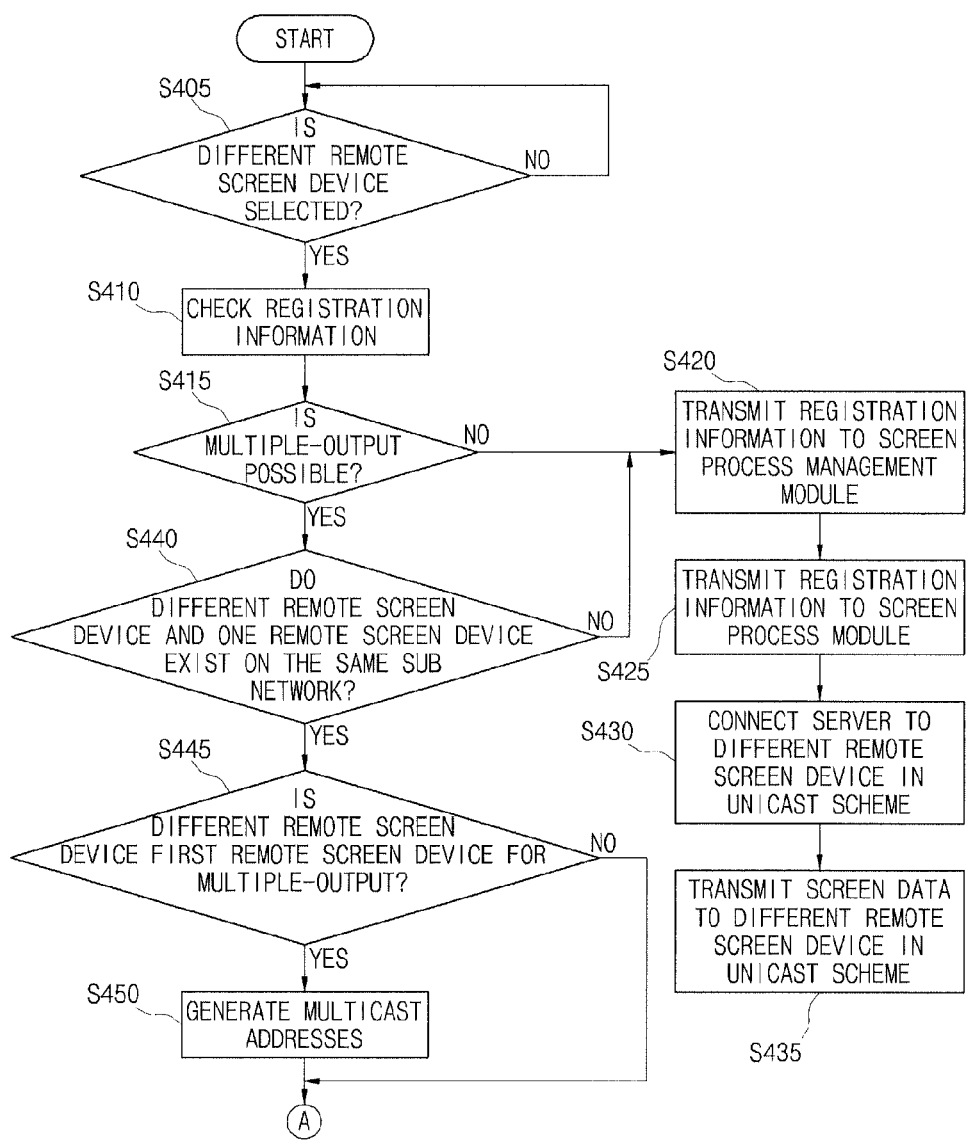
FIGS. 4A to 4B are flow charts illustrating a multi-hop MIMO method of a server according to an exemplary embodiment of the present invention.
Figure 4B:
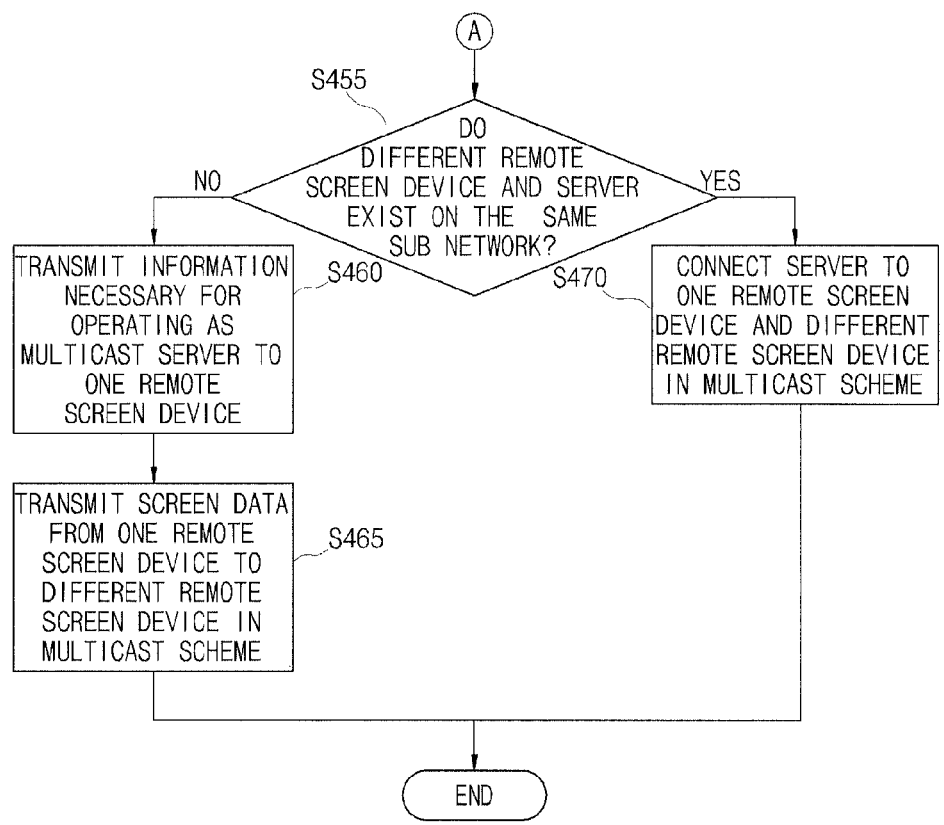

FIGS. 4A to 4B are flow charts illustrating a multi-hop MIMO method of a server according to an exemplary embodiment of the present invention.

Referring to FIGS. 4A to 4B, if a different remote screen device 250_2 is selected subsequently to one remote screen device 250_1 (S405), the device management module 111 of the server transmits registration information on the different remote screen device 250_2 to the multiple-output module 112 of the server (S410).

The multiple-output module 112 of the server determines whether the different remote screen device 250_2 is a device for multiple-output by using the registration information (S415).

If the different remote screen device 250_2 is not a device for multiple-output, the multiple-output module 112 of the server transmits the registration information to the screen process management module 113 of the server for unicast scheme communication with the different remote screen device 250_2 (S420).

The screen process management module 113 of the server generates the screen process module 114 of the server by using the registration information (S425).

The screen process module 114 of the server performs connection with the screen process module 253_2 of the different remote screen device 250_2 for unicast communication and transmits the screen data to the screen process module 253_2 (S430).

Then, the remote process module 253_2 outputs the received screen data to the user (S435).

As the result of the determination of the step S415, if the different remote screen device 250_2 is a device for multiple-output, the multiple-output module 112 of the server checks whether the different remote screen device 250_2 and the one remote screen device 250_1 exist on the same sub network (S440).

If the different remote screen device 250_2 and the one remote screen device 250_1 exist on different sub networks, the server 100 outputs the screen data to the different remote screen device 250_2 through steps S425 to S435.

If the different remote screen device 250_2 and the one remote screen device 250_1 exist on the same sub network, the multiple-output module 112 of the server checks whether the different remote screen device 250_2 is the first remote screen device for multiple-output (S445).

If the different remote screen device 250_2 is the first remote screen device, the multiple-output module 112 of the server generates multicast addresses for multiple-output (S450), and the procedure proceeds to step S455.

If the different remote screen device 250_2 is not the first remote screen device, the multiple-output module 112 of the server checks whether the different remote screen device 250_2 and the server 100 exist on the same sub network (S455).

If the different remote screen device 250_2 and the server 100 exist on different sub networks, the multiple-output module 112 of the server transmits information necessary for performing a multicast server function to the one remote screen device 250_1 to operate as a multicast server for the different remote screen device 250_2 and transmits information necessary for performing a multicast client function to the different remote screen device 250_2 (S460).

Subsequently, the one remote screen device 250_1 is driven as the multicast server, and the multiple-output module 252_1 of the one remote screen device 250_1 transmits the screen data received from the server to the different remote screen device 250_2 in the multicast scheme (S465). Then, the screen process module 253_2 of the different remote screen device 250_2 receives the screen data transmitted in the multicast scheme and outputs the screen data to the user.

If the different remote screen device 250_2 and the server 100 are on the same sub network, the multiple-output module 112 of the server operates as the multicast server (S470). Specifically, the multiple-output module 112 of the server stops the unicast scheme connection with the one remote screen device 250_1, makes the one remote screen device 250_1 and the different remote screen device 250_2 serve as multicast clients, and transmits the screen data to the two remote screen devices 250_1 and 250_2 in the multicast scheme.

Figure 5A:
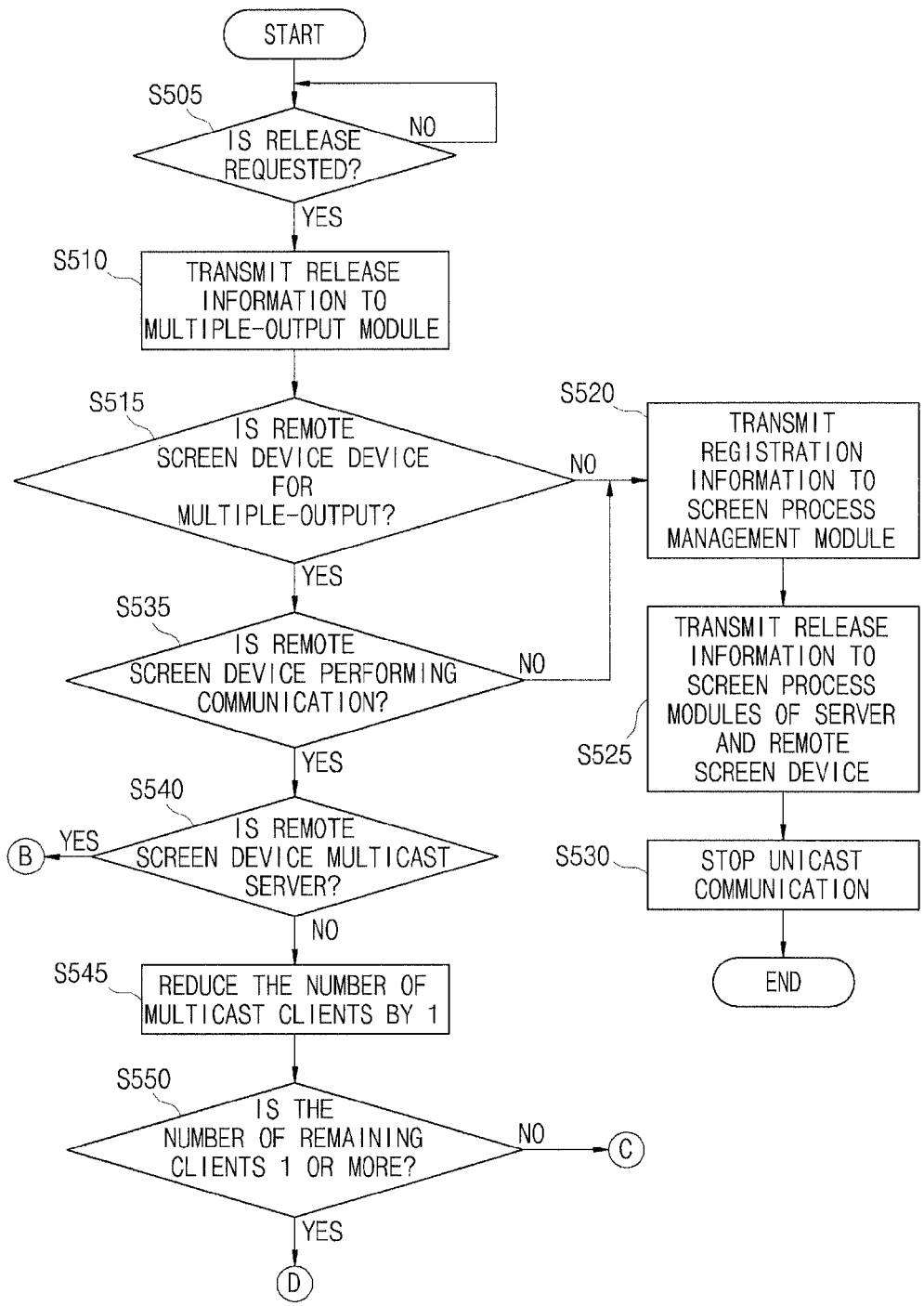
FIGS. 5A to 5C are flow charts illustrating a remote screen device releasing method of a server according to an exemplary embodiment of the present invention.
Figure 5B:
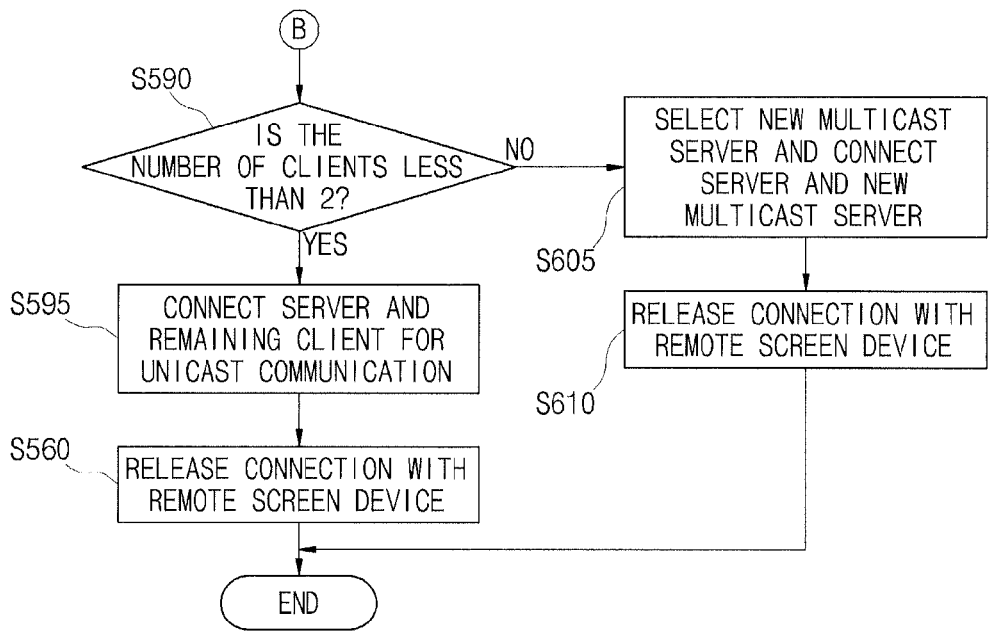
Figure 5D:
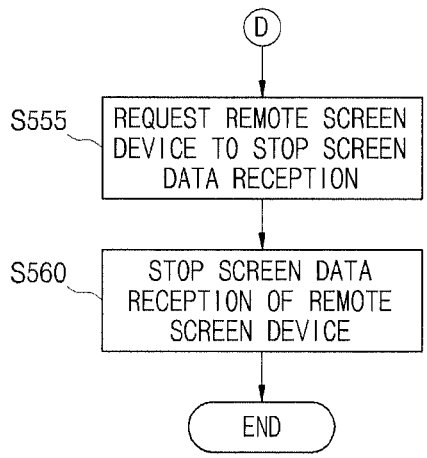
Figure 5C:
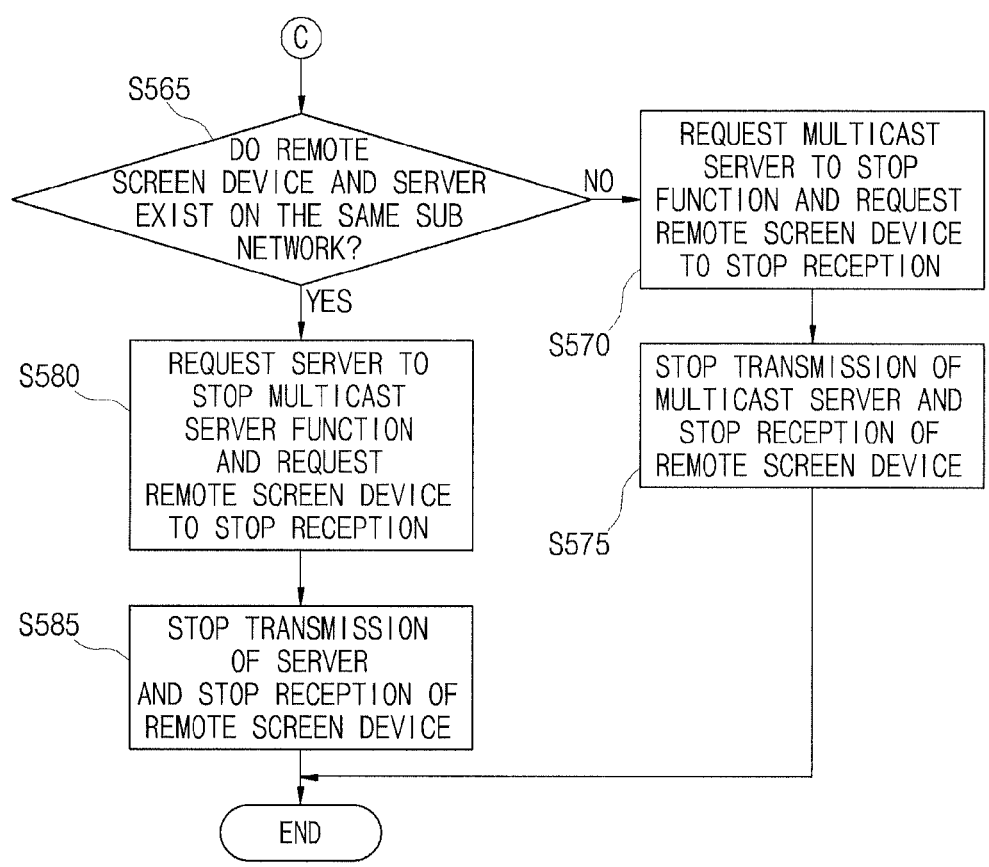

Hereinafter, a procedure through which the server releases a remote screen device according to an exemplary embodiment of the present invention will be described with reference to FIGS. 5A to 5C. FIGS. 5A to 5C are flow charts illustrating a remote screen device releasing method of the server according to an exemplary embodiment of the present invention.

Referring to FIGS. 5A to 5C, if release of assignment for a remote screen device 250 is requested (Yes in step S505), the device management module 111 of the server transmits release information to the multiple-output module 112 of the server (S510).

The multiple-output module 112 of the server checks whether the remote screen device 250 is a device for multiple-output (S515).

As the checked result of the step S515, if the remote screen device 250 is not a device for multiple-output, the multiple-output module 112 of the server transmits the release information to the screen process management module 113 of the server (S520).

The screen process management module 113 transmits release information to the screen process module 114 of the server and the screen process module 252 of the remote screen device (S525).

The screen process module 114 of the server and the screen process module 252 of the remote screen device stop the unicast communication connection with the screen process management module 113 and stop screen data transmission and reception (S530).

As the checked result of the step S515, if the remote screen device 250 is a device for multiple-output, the multiple-output module 112 of the server checks whether the remote screen device 250 is performing communication in the unicast scheme (S535).

As the checked result of the step S535, if the remote screen device 250 is performing communication in the unicast scheme, the above-mentioned steps S520 to S530.

As the checked result of the step S535, if the remote screen device 250 is not performing communication in the unicast scheme, it is checked whether the remote screen device 250 is operating as a multicast server (S540).

As the checked result of the step S540, if the remote screen device 250 is not operating as a multicast server, it is determined that the remote screen device 250 is a multicast client, the total number of multicast clients is reduced (S545), and it is checked whether the number of remaining multicast clients is equal to or greater than 1 (S550).

If the number of remaining multicast clients is equal to or greater than 1, the multiple-output module 112 of the server requests the multiple-output modules 252_1 and 252_2 of the remote screen devices 250 to stop screen data reception (S555).

Subsequently, the multiple-output module 252 of the remote screen device 250 stops receiving the screen data transmitted in the multicast scheme (S560).

If the number of remaining multicast clients is less than 1, the multiple-output module 112 of the server checks whether the remote screen device 250 and the server exist on the same sub network (S565).

If the remote screen device 250 and the server exist on the different sub networks, the multiple-output module 112 of the server requests a remote screen device operating as the multicast server for the remote screen device 250 to stop the multicast server function and requests the multiple-output module 252 of the remote screen device 250 operating as the multicast client to stop receiving the screen data (S570).

Then, the remote screen device operating as the multicast server stops the multicast server function and the remote screen device 250 stops receiving the screen data (S575).

If the remote screen device 250 and the server exist on the same sub network, the multiple-output module 112 of the server requests the screen process management module 113 to stop the multicast server function and requests the multiple-output module 252 of the remote screen device to stop receiving the screen data (S580).

Then, the screen process management module 113 stops the multicast server function and the multiple-output modules 252 of the remote screen device 250 stops receiving the screen data (S585).

Meanwhile, as the checked result of the step S540, if the remote screen device 250 is operating as a multicast server, it is checked whether the number of multicast clients is equal to or less than 1 (S590).

If the number of multicast clients is equal to or less than 1, the multiple-output module 112 of the server is connected to the multicast client in the unicast scheme (S595).

Subsequently, the multiple-output module 112 of the server releases the unicast scheme connection with the remote screen device 250 and stops multicast scheme transmission of the screen data through the remote screen device 250 (S600).

If the number of multicast clients is equal to or greater than 2, the multiple-output module 112 of the server selects a new multicast server from the multicast clients and is connected to the new multicast server in the unicast scheme (S605).

Also, the multiple-output module 112 of the server releases the unicast scheme connection with the remote screen device 250 and stops transmitting the screen data (S610).

Then, the remote screen device selected as the new multicast server stops receiving the screen data in the multicast scheme, receives the screen data from the server 100 in the unicast scheme, and transmits the received screen data to the multicast clients in the multicast scheme.

According to the exemplary embodiments of the present invention, it is possible to establish a computing environment capable of simultaneously transmitting data to a number of remote screen devices independently from a system of a network layer. Therefore, it is possible to simultaneously transmit screen data to a number of remote screen devices regardless of whether a router supports a multicast protocol.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multi-hop MIMO method of a server, comprising:
   determining whether selection registration of a different remote screen device is requested subsequently to one remote screen device and if so checking whether the different remote screen device is a multiple-output device and when not, transmitting registration information;
   determining whether, the different remote screen device is a multiple-output device and if so checking whether the different remote screen device and the one remote screen device exist on the same sub network and when not, transmitting registration information;
   determining whether the different remote screen device and the one remote screen device exist on the same sub network, the different remote screen device and the server exist on different sub networks and if so transmitting screen data from the one remote screen device to the different remote screen device in a multicast scheme.

2. The method of claim 1, further comprising when the different remote screen device is not a multiple-output device, connecting the different remote screen device to the server in a unicast scheme and transmitting the screen data from the server to the different remote screen device.

3. The method of claim 1, further comprising when the different remote screen device and the one remote screen device exist on different sub networks, connecting the different remote screen device to the server in a unicast scheme and transmitting the screen data from the server to the different remote screen device.

4. The method of claim 1, further comprising when the different remote screen device and the server exist on the same sub network, transmitting the screen data from the server to the different remote screen device in a unicast scheme or the multicast scheme.

5. The method of claim 4, wherein the transmitting of the screen data includes transmitting information necessary for transmitting and receiving the screen data in the multicast scheme or the unicast scheme.

6. A multi-hop MIMO method of a server, comprising:
determining assignment release is requested from a remote screen device and if so checking whether the remote screen device is a multiple-output device and when not, transmitting registration information;
determining the remote screen device is a multiple-output device and if so checking whether the remote screen device is performing communication in a multicast scheme and when not, transmitting registration information;
determining the remote screen device is performing communication in the multicast scheme and if so checking whether the remote screen device is operating as a multicast server and when not, transmitting registration information;
determining the remote screen device is operating as a multicast server and if so checking whether the number of multicast clients receiving screen data from the remote screen device in the multicast scheme is two or more and when the number of multicast clients is two or more, selecting a new multicast server from the multicast clients and releasing the connection with the remote screen device.

7. The method of claim 6, further comprising when the remote screen device is not a multiple-output device, or when the remote screen device is performing communication in a unicast scheme, releasing the unicast scheme connection.

8. The method of claim 6, wherein as the result of the checking whether the number of multicast clients is two or more, when the number of multicast clients is one, the releasing further includes connecting the one remaining multicast client in a unicast scheme and releasing the connection with the remote screen device.

9. The method of claim 6, further comprising:
when the remote screen device is one of performing communication in the multicast scheme and not operating as the multicast server,
determining that the remote screen device is a multicast client, reducing the number of multicast clients by 1, and then checking the number of remaining multicast clients after the reduction; and
when the number of remaining multicast clients after the reduction is less than 1, releasing the connection between the remote screen device and the server.

10. The method of claim 9, further comprising:
when the number of remaining multicast clients after the reduction is 1 or more, checking whether the remote screen device and the server exist on the same sub network, and
when the remote screen device and the server exist on different sub networks, requesting one remote screen device operating as a multicast server for the remote screen device to stop a multicast server function and instructing the remote screen device to stop data reception.

11. The method of claim 10, further comprising when the remote screen device and the server exist on the same sub network, stopping the multicast server function and instructing the remote screen device to stop data reception.

* * * * *